United States Patent
Francisco

[19]
[11] Patent Number: 6,153,095
[45] Date of Patent: Nov. 28, 2000

[54] DRAINPIPE FILTER KIT

[76] Inventor: Richard Francisco, 4040 Seven Hills Rd., Castro Valley, Calif. 94546

[21] Appl. No.: 09/290,035

[22] Filed: Apr. 8, 1999

[51] Int. Cl.⁷ .................................................. B01D 35/02
[52] U.S. Cl. ........................ 210/153; 210/443; 210/445; 210/453; 210/459; 4/679; 4/291; 4/292
[58] Field of Search .................................. 210/153, 443, 210/445, 453, 459, 447; 4/290, 291, 292, 679

[56] References Cited

U.S. PATENT DOCUMENTS

| | | | |
|---|---|---|---|
| 705,447 | 7/1902 | Sargent | 210/209 |
| 852,044 | 4/1907 | Van der Minden | |
| 1,608,966 | 11/1926 | Tanaka | 210/443 |
| 1,817,376 | 8/1931 | Izquierdo | 210/447 |
| 2,467,143 | 4/1949 | Mitchell | 210/443 |
| 2,467,547 | 4/1949 | Birnbaum | 210/532.1 |
| 2,792,120 | 4/1957 | Tinker | 210/453 |
| 4,539,718 | 9/1985 | Haer | 4/679 |
| 4,609,459 | 9/1986 | Hendrix | 210/445 |
| 4,700,412 | 10/1987 | Manuel | 4/679 |
| 4,949,406 | 8/1990 | Canelli | 4/679 |
| 5,075,905 | 12/1991 | Rutherford | 4/679 |
| 5,525,215 | 6/1996 | Marchionda | 210/153 |
| 5,638,557 | 6/1997 | Iida | 4/679 |

*Primary Examiner*—Christopher Upton
*Attorney, Agent, or Firm*—Richard Esty Peterson, Patent Attorney

[57] ABSTRACT

A drainpipe filter kit for installation on a sink drain, the kit having the parts necessary to install a substitute drain pipe with a filter canister between the sink drain and the sink trap, the kit including a drainpipe segment with end fittings for connection to a sink drain and trap, and a removable canister connected to the pipe segment having a drain spigot and a disposable filter packet. The filter packet includes a dissolvable sanitation tablet, the canister being easily removed after draining for disposal and replacement of the filter packet.

10 Claims, 2 Drawing Sheets

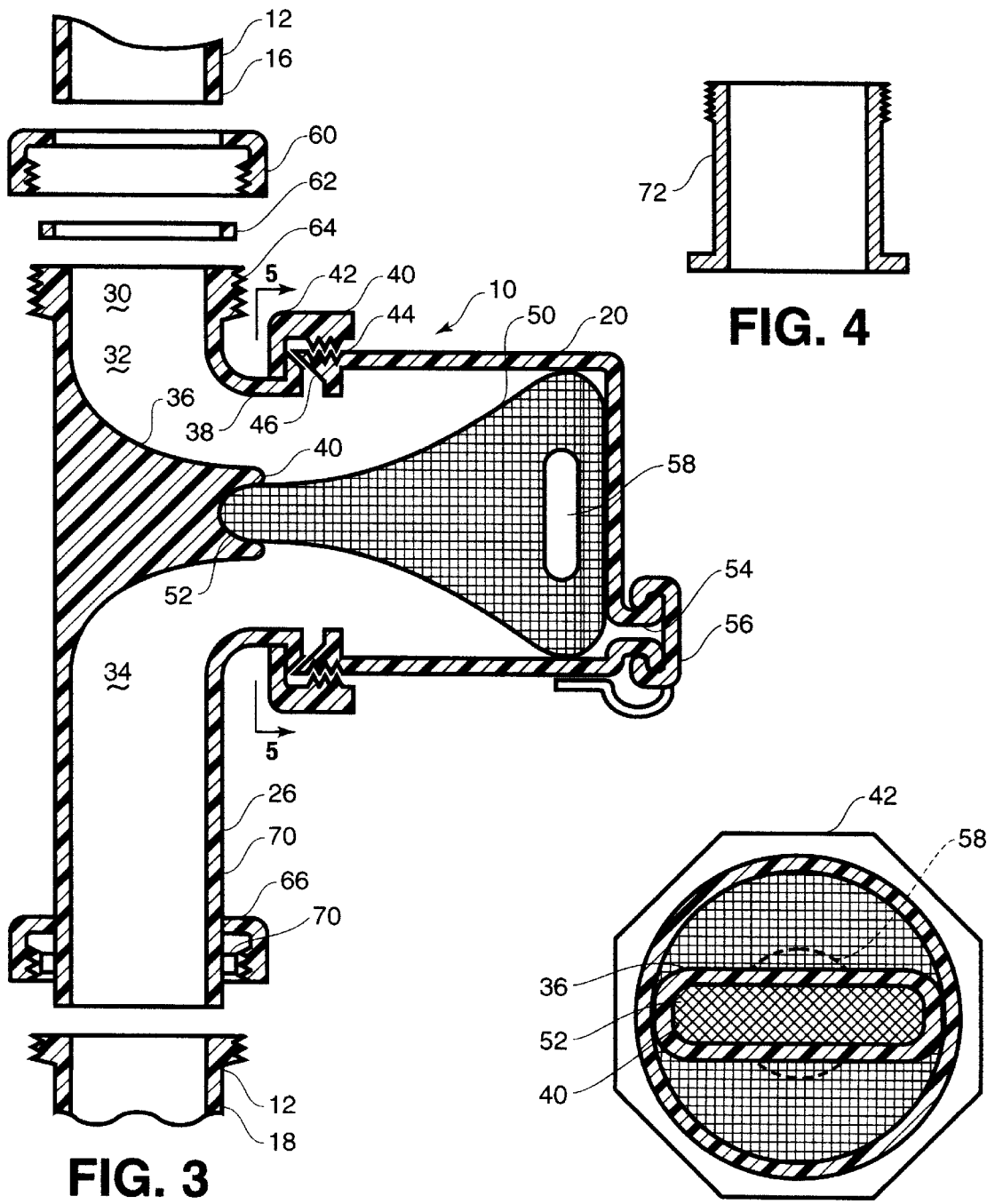

DRAINPIPE FILTER KIT

BACKGROUND OF THE INVENTION

This invention relates to a filtering device to be used on a drainpipe, such as the drainpipe of a sink. The filtering device of this invention is designed for periodic removal and replacement of the filter member and is therefore particularly adapted for sinks where the drainpipe is easily accessible.

In many environments, particularly a household, clogging of a drain system can be an inconvenient and expensive problem. While the problem is frequently solved by removal of the sink trap, the task is cumbersome and messy. Often the trap when replaced leaks and new gaskets must be obtained. Sometimes removal and cleaning of the trap does not resolve the problem and a plumber must be called with the attendant expense of a house call. Although clogged drains can also be relieved using a chemical drain cleaners, this is to be avoided as the chemicals are caustic and can damage pipe and fittings.

Additionally, removal of the sink trap to recover lost articles such as rings or contact lenses is a chore. Frequently, lightweight items may be flushed beyond the trap and lost before the sink can be plugged or the water flow stopped.

Several prior art devices have been suggested for filtering or straining drain water to remove hair and other debris that may otherwise lead to a plugged drain. Some of the devices provide for recovery of lost items. These devices require modification or replacement of the sink trap. In most areas, building codes prevent the modification or replacement of a trap with an unapproved filtering device incorporated into the trap.

It is an object of this invention to provide a drainpipe filter kit that can be installed in the drainpipe above the trap without modification of the trap. The filter kit includes a manifold drainpipe that is modified to include a side canister having a replaceable filter member. The canister is preferably of clear plastic material to allow visual inspection of the filter member. The canister is easily separated from the drainpipe to retrieve trapped items or replace the filter. These and other features of the drainpipe filter kit are described in greater detail hereafter.

SUMMARY OF THE INVENTION

The drainpipe filter kit of this invention is devised as an easily installed filtering unit for a drainpipe, particularly the drainpipe of a sink. Because of the ease of installation, the drainpipe filter kit is especially useful in the household on a sink.

The drainpipe filter kit includes a manifold drainpipe that connects to the pipe extension of the sink drain. An adaptor is provided in the kit for sinks having a metal extension pipe that is internally threaded. The installed filter unit replaces the straight pipe interconnecting the sink pipe extension to the sink trap. No modification to the pipe extension of the sink drain or to the trap is normally required. The manifold drainpipe includes an internal baffle and a side opening with an attached canister. The canister contains a filter member that is joined to the baffle to provide a strainer for filtering water flowing through the filter unit. An elongated section of the manifold drainpipe below the side opening and connected canister may be cut to the appropriate length to adapt the drainpipe to a particular installation. The resulting filter unit is positioned in the same location that the straight pipe segment occupied before replacement.

The filter unit includes the manifold drainpipe with the canister and filter member together with fittings for connecting the unit to a sink extension and to a trap. The unit also includes a replaceable filter member and a drain spigot to drain the canister of any residue water before removing the canister and replacing the filter member. The filter member includes a slowly dissolvable sanitation tablet that disinfects and deodorizes the filter member and is designed to last a month or more. One or two extra filter members are provided with the kit and it is contemplated that replacement filters are to be sold in packs of six or twelve.

The unit is preferably fabricated of plastic with a clear plastic canister to allow visual inspection of the contained filter. The unit is also fabricated in metal for those jurisdictions or environments where plastic piping and fittings are not permitted.

BRIEF DESCRIPTION OF THE DRAWINGS

FIG. 3 is a cross-sectional exploded view of the filter unit and a portion of a typical drain system.

FIG. 4 is an adaptor provided with the filter unit in a filter kit.

FIG. 5 is a cross sectional view taken on the lines 5—5 in FIG. 3 showing the filter member.

DETAILED DESCRIPTION OF THE PREFERRED EMBODIMENTS

Figure 1:
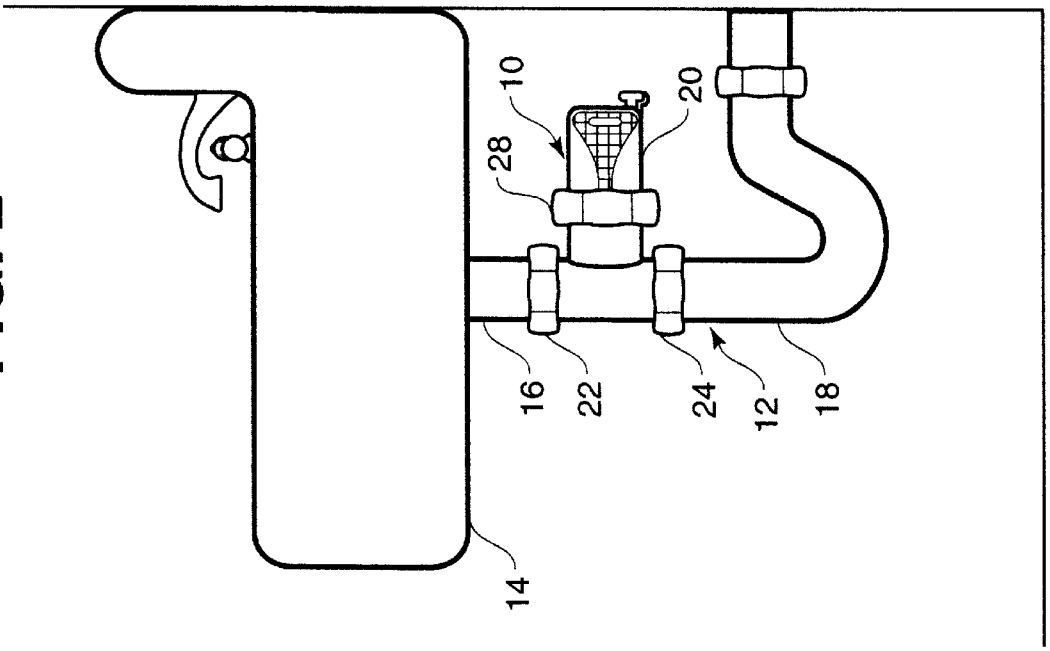
FIG. 1 is a front view of a sink with an installed filter unit.
Figure 2:
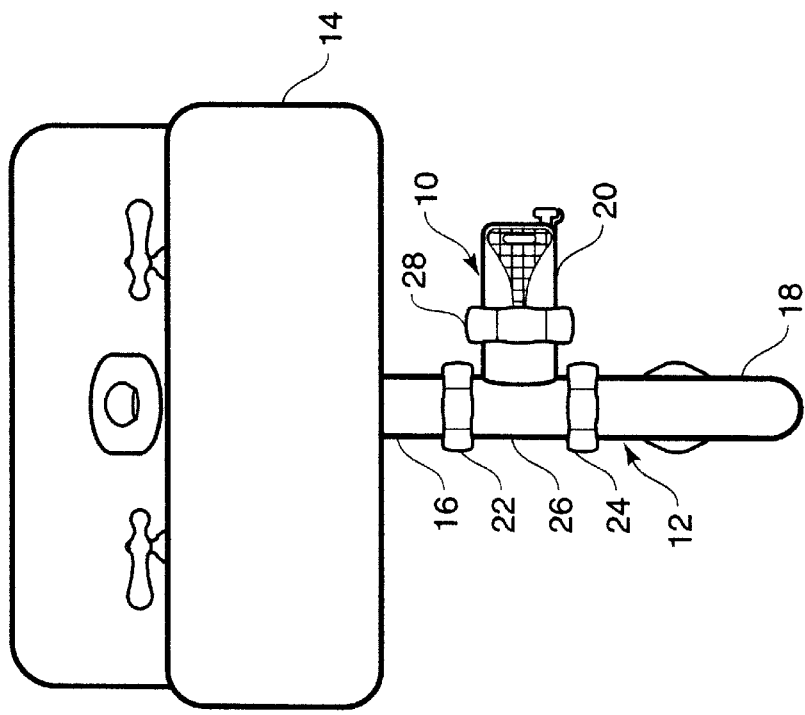
FIG. 2 is a side view of a sink with an installed filter unit in an alternate position.

Referring to FIGS. 1 and 2, a filter unit 10 is shown installed on the drain system 12 of a typical sink 14. The filter unit 10 is installed between an extension pipe 16 of the sink 14 and p-trap 18. In FIG. 1 the filter unit 10 is oriented for convenient visual inspection and removal of a canister 20.

In FIG. 2 the canister 20 is pivoted to the back of the drain system 12, where it is desired that the unit 10 be less visible. The filter unit 10 is connected to the extension pipe 16 and p-trap 18 by conventional compression nuts 22 and 24. The canister 20 is similarly connected to a manifold pipe segment 26 of the unit 10 by a compression nut 28.

Referring to FIG. 3, the internal construction of the filter unit 10 is shown in relation to the relevant portion of the drain system 12. The filter unit 10 includes the manifold pipe segment 26 shown with an internal passage 30 divided into an upper portion 32 and a lower portion 34 by an internal baffle 36. The internal passage 30 has a side opening 38 with the baffle 36 having a seating edge 40 extending across the side opening 38.

The canister 20 is coupled to the manifold pipe segment 26 at the side opening 36 by a compression nut 42, which engages threads 44 on the canister forcing the beveled rim 46 against a complimentary beveled lip 48 around the side opening 38.

Contained in the canister 20 is a filter member 50 formed of a partially deformable mesh material, such as fibrous plastic. The filter member has sufficient structural integrity to maintain its shape when an elongated engagement edge 52 is engaged in the elongated seating edge 40 of the baffle 36 as shown in FIG. 5.

The canister 20 is fabricated of clear plastic to enable the filter member to be observed when the canister is coupled to the manifold pipe segment 26. The canister has a drain spigot 54 with a cap 56, which should be oriented at the bottom when the canister 20 is assembled with the filter member 50. The partially deformable filter member 50 is press fit into the canister 20 and maintains its position when aligned with the baffle 36 during assembly. With the rim 46 of the canister seated on the lip 48 of the side opening, the compression nut 42 can be tightened while the canister is held in position.

The filter member 50 includes a sanitizer tablet 58 that slowly dissolves. The sanitizer tablet 58 also includes a deodorizer to prevent the filter member 50 from giving of unpleasant odors as debris is collected.

The filter member 50 is designed as a dispensable item and it is contemplated that replacement filters are purchased separately. When the filter unit is sold in kit form, two or three extra filter members are provided.

The filter kit includes a compression nut 60 with a gasket 62 for the threaded top 64 of the pipe segment 26 and a slip-on compression nut 66 and gasket 68 for an extension portion 70 of the manifold pipe segment 26. The extension portion 70 may be cut to an appropriate length when fitting the filter unit to the p-trap 18 and sink pipe 16.

To accommodate installation of the filter unit 10 to a sink having a threaded sink pipe or other drain connection, the filter kit includes one or more adapters such as the metal adaptor 72 shown in FIG. 4. The compression nut 60 and gasket 62 are slipped over the adaptor before threading the adaptor to a sink drain.

The filter unit is preferably fabricated from plastic customarily used for drains and traps. However, the filter unit, excepting the canister and filter member, may be fabricated from metal.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A drainpipe filter unit adapted to replace a conventional drainpipe section in a sink drain, the drainpipe filter unit comprising:

a pipe segment having a top end with means for connecting the top end to a sink drain, a bottom end with means for connecting the bottom end to a trap, wherein the pipe segment is vertically oriented, and an internal passage with a side opening;

wherein the pipe segment has an internal solid baffle across the internal passage at the side opening dividing the passage into an upper portion and a lower portion, the baffle having a horizontal seating edge across the side opening;

a canister having an open end, wherein the side opening of the pipe segment and the open end of the canister have cooperating coupling means for coupling the canister to the side opening of the pipe segment; and, a filter member sized to separate the canister into an upper portion and a lower portion, the filter member having an engagement edge, wherein when the filter member is installed in the canister the engagement edge is seatable on the seating edge of the baffle of the pipe segment and the upper portion of the canister is separated from the lower portion of the canister by the filter member.

2. The drainpipe filter unit of claim 1 wherein the filter member of the filter unit includes a sanitary tablet.

3. The drainpipe filter unit of claim 1 wherein the bottom end of the pipe segment comprises a pipe extension that is adapted to be cut to fit the filter unit to a particular installation.

4. The drainpipe filter unit of claim 1 wherein the connecting means for the top end and the connecting means for the bottom end are conventional compression nuts with gaskets.

5. The drainpipe filter unit of claim 1 wherein the filter unit is part of a filter kit with supplemental adapters to adapt the unit to a particular installation.

6. The drainpipe filter unit of claim 1 wherein the canister includes a drain spout and cap for draining the canister of water before replacement of the filter member.

7. The drainpipe filter unit of claim 1 wherein the filter member is disposable.

8. The drainpipe filter unit of claim 1 in the form of a kit with additional filter members.

9. The drainpipe filter unit of claim 1 wherein the solid baffle is contoured.

10. The drainpipe filter unit of claim 1 wherein the filter member is contoured.

* * * * *